(12) United States Patent
Giordano et al.

(10) Patent No.: US 9,067,684 B2
(45) Date of Patent: Jun. 30, 2015

(54) ELECTRICAL POWER SUPPLY DEVICE FOR POWERING AT LEAST ONE PIECE OF EQUIPMENT OF AN AIRCRAFT ROTOR, AND AN AIRCRAFT

(71) Applicant: AIRBUS HELICOPTERS, Marignane, Cedex (FR)

(72) Inventors: Serge Giordano, Marseille (FR); Vincent Bourget, Jonquerettes (FR)

(73) Assignee: Airbus Helicopters, Marignane Cedex (FR)

( * ) Notice: Subject to any disclaimer, the term of this patent is extended or adjusted under 35 U.S.C. 154(b) by 88 days.

(21) Appl. No.: 13/889,488

(22) Filed: May 8, 2013

(65) Prior Publication Data

US 2013/0307378 A1    Nov. 21, 2013

(30) Foreign Application Priority Data

May 16, 2012   (FR) ........................................ 1201410

(51) Int. Cl.
| | | |
|---|---|---|
| *B64D 15/12* | (2006.01) | |
| *H02K 7/18* | (2006.01) | |
| *B64C 27/12* | (2006.01) | |
| *B64C 27/32* | (2006.01) | |

(52) U.S. Cl.
CPC .............. *B64D 15/12* (2013.01); *H02K 7/1823* (2013.01); *H02K 7/1861* (2013.01); *B64C 27/12* (2013.01); *B64C 27/32* (2013.01)

(58) Field of Classification Search
CPC ........ B64C 27/12; B64C 27/14; B64C 27/18; B64D 27/02; B64D 2027/026; B64D 35/02; B64D 2041/002; B64D 15/12; B64D 41/00; H01F 38/18; H01F 21/06; G01D 5/2066; G01D 5/204

USPC ............................. 244/17.11, 58, 60; 336/115
See application file for complete search history.

(56) References Cited

U.S. PATENT DOCUMENTS 3,441,887 A * 4/1969 Costa ............................. 336/120
5,572,178 A * 11/1996 Becker et al. ................. 336/120
(Continued)

FOREIGN PATENT DOCUMENTS

| EP | 0629318 A1 | 12/1994 |
|---|---|---|
| EP | 0777602 A1 | 6/1997 |

(Continued)

OTHER PUBLICATIONS

Search Report and Written Opinion; Application No. FR 1201410; dated Mar. 1, 2013.

*Primary Examiner* — Tien Dinh
*Assistant Examiner* — Vicente Rodriguez
(74) *Attorney, Agent, or Firm* — Brooks Kushman P.C.

(57) ABSTRACT

An electrical power supply device (10) comprising a pole (11), said pole (11) having a non-rotary casing (15) and a rotary casing (12) provided with fastener means (14) for fastening to a mast. The pole (11) includes a non-rotary converter (20) fastened to the non-rotary casing (15) and generating AC at a frequency higher than one kilohertz. The pole also includes a rotary transformer (25), said rotary transformer (25) having a primary member (26) secured to the non-rotary casing (15) and a secondary member (27) secured to the rotary casing (12), the primary member (26) being connected to the non-rotary converter (20) to receive said AC, and the secondary member (27) being suitable for electrically powering equipment (100) of a rotor (2).

14 Claims, 5 Drawing Sheets

(56) References Cited

U.S. PATENT DOCUMENTS

| | | | |
|---|---|---|---|
| 6,181,235 B1 * | 1/2001 | Smith | 318/696 |
| 6,769,874 B2 * | 8/2004 | Arel | 416/95 |
| 8,575,900 B2 * | 11/2013 | Spierling | 322/34 |
| 8,628,042 B2 * | 1/2014 | Imbert et al. | 244/134 D |
| 2008/0292467 A1 * | 11/2008 | Borgen | 416/244 R |
| 2011/0024567 A1 | 2/2011 | Blackwelder et al. | |

FOREIGN PATENT DOCUMENTS

| | | |
|---|---|---|
| EP | 2218643 A1 | 8/2010 |
| FR | 2553596 A1 | 4/1985 |
| FR | 2960516 A1 | 12/2011 |
| GB | 584563 A | 1/1947 |
| GB | 2264812 A | 9/1993 |
| GB | 2293522 A | 3/1996 |
| WO | 2010015359 A1 | 2/2010 |

* cited by examiner

ELECTRICAL POWER SUPPLY DEVICE FOR POWERING AT LEAST ONE PIECE OF EQUIPMENT OF AN AIRCRAFT ROTOR, AND AN AIRCRAFT

CROSS REFERENCE TO RELATED APPLICATIONS

This application claims priority to French patent application No. FR 12/01410 filed on May 16, 2012, the content of which is incorporated herein.

BACKGROUND OF THE INVENTION (1) Field of the Invention

The present invention relates to a device for electrically powering at least one piece of equipment of a rotor, and also to an aircraft including such a device.

The invention lies in the technical field of means for electrically powering a rotary member, and more particularly de-icing/anti-icing members of a rotorcraft rotor.

(2) Description of Related Art

Certain aircraft are provided with devices for de-icing/anti-icing airfoil surfaces, in particular blades of a rotor. The problem of such airfoil surfaces icing is well known in the aviation industry, it being possible for the aerodynamic profile of such surfaces to be modified unfavorably as a result of ice forming in flight because of impacts against droplets of supercoiled water contained in the atmosphere. This problem is often countered by fitting the airfoil surface with a heater structure.

However, it will be understood that it can be difficult to deliver electrical power to equipment present on a rotary assembly from an electricity generator that is present in a stationary frame of reference within the airframe of the aircraft.

Various devices are known for conveying electricity to a rotary assembly that is permanently and irreversibly mounted on propellers, in particular propulsive propellers or wind turbines.

Document FR 2 553 596 describes a propeller including electricity generator means within its hub for powering an electrical system for changing the pitch of propeller blades and de-icing means.

Document EP 0 629 318 describes using a magnet free to rotate between two sets of windings arranged within a propeller.

Document EP 0 777 602 includes a generator having winding carried by a rotor, the windings co-operating with a stationary permanent magnet.

Document EP 2 218 643 describes an electrical machine arranged in a propeller for electrically powering electrical resistors. The alternator has a stator secured to a stationary casing of the propeller and windings secured to a rotary mast of the propeller.

Document US 2011/0024567 describes apparatus arranged in a turboprop having two contrarotating propellers in order to generate electricity.

The same applies to document GB 584 563.

Document WO 2010/015359 describes electricity generators arranged on a wind turbine propeller for feeding electricity to means for modifying the pitch of blades of the propeller, each generator having a rotary portion co-operating with a toothed ring in the nacelle of the propeller.

It can be seen that some of the above documents do indeed relate to airplanes that might fly in clouds loaded with super cooled droplets of water such that they are always faced with the problem of icing. Under such circumstances, it can indeed be useful to arrange an electrical power supply device permanently in the propeller of such an airplane for de-icing or anti-icing purposes.

Likewise, a device for powering electrical means for varying the pitch of a propeller may be present on a permanent basis in that propeller.

However, certain aircraft, and in particular rotorcraft, do not require such an electrical power supply device to be installed permanently.

Consequently, a device is known that is provided with an alternating current (AC) generator connected to an electrical unit sometimes referred to as a "power de-icing unit". The electrical unit is provided in particular with an electrical rectifier and a sequencer for powering a plurality of electric cables in a predetermined sequence. Furthermore, as a safety measure, the electrical unit is duplicated.

The generator and the electrical unit are installed in a stationary frame of reference, i.e. the airframe of a rotorcraft.

Consequently, the device has a slip ring unit comprising a non-rotary portion and a rotary portion, which portions are connected together by a system of brushes rubbing against rings. The non-rotary portion may for example possess circular rings that are electrically powered by electric cables coming from the electrical unit, while the rotary portion has respective brushes traveling over the rings.

The slip ring unit can be mounted reversibly so as to be used only during winter periods or only for particular missions. Nevertheless, such a slip ring unit is very heavy and difficult to put into place, in particular because of the presence of a large number of electrical cables of large dimensions and because of the presence of the slip rings themselves.

Furthermore, friction between each brush and the corresponding slip ring tends to degrade the performance of the slip ring unit. Maintenance actions requiring the device to be dismantled then need to be undertaken relatively often. Unfortunately, the slip ring unit is sometimes difficult to access, so the cost of maintenance can be high and the rotorcraft can be out of service for a long time.

Document FR 2 960 516 describes a device for electrically powering and controlling equipment on a rotor. That device has a three-phase AC generator arranged in a stationary reference frame, and a rotating field transformer having a stationary portion connected to the generator and a rotary portion that is connected to a sequencer, which is arranged in the rotary reference frame.

That device is advantageous in that it avoids using a slip ring unit with brushes.

Document U.S. Pat. No. 5,572,178 describes a rotary transformer having primary and secondary windings and magnetic circuits for optimizing the passage of magnetic field lines.

An electrical power supply device is also known for powering at least one piece of equipment on an aircraft rotor that is driven by a mast. That device comprises a removable pole suitable for being reversibly secured to the mast. The pole also includes an upper alternator and an upper tube suitable for being constrained to rotate with the mast, the upper alternator having a plurality of upper windings that are fastened to the upper tube, the pole having a shaft carrying at least one upper permanent magnet of the upper alternator. A mechanism then allows the shaft and the upper tube to perform distinct rotary movements.

That device is thus a removable device.

Documents GB 2 264 812 and GB 2 293 522 are also known.

BRIEF SUMMARY OF THE INVENTION

An object of the present invention is thus to propose a removable electrical power supply device suitable for incorporating in an aircraft and seeking to minimize maintenance actions.

The invention provides an electrical power supply device for powering at least one piece of equipment of an aircraft rotor driven by a mast. The device comprises a removable pole suitable for being reversibly secured to the mast, the pole having a rotary casing provided with fastener means for fastening to the mast, and a non-rotary casing secured to link means suitable for being fastened to a reference member of the aircraft.

The pole further comprises:

a non-rotary converter fastened to the non-rotary casing and provided with an inlet suitable for being fed with electricity coming from an electricity network of said aircraft, said non-rotary converter being an electrical converter that generates AC at a frequency higher than one kilohertz from the electricity fed to the inlet; and a rotary transformer incorporated in the pole, the transformer having a primary member secured to the non-rotary casing and a secondary member secured to the rotary casing, the primary member being connected to the non-rotary converter to receive the AC, and the secondary member being suitable for electrically powering equipment of a rotor.

Thus, in the invention, a removable device is used that can be inserted reversibly in the mast of a rotor. The rotary casing is then fastened to the mast by the fastener means. Such fastener means may include a collar screwed to the mast, or a hub secured to the mast.

In contrast, the non-rotary casing is fastened to a non-rotary reference member of the aircraft. This non-rotary casing can thus be referred to as a "stationary" casing.

It should be understood that the term "rotary" is associated with members that rotate together with a mast about an axis of rotation of a rotor. Conversely, the term "non-rotary" is associated with members that do not perform rotation together with the drive mast of a rotor.

The rotary casing and the associated members thus perform rotary motion around an axis of rotation, while the non-rotary casing is stationary relative to the axis of rotation.

Under such circumstances, the pole has a non-rotary converter. The non-rotary converter may be powered electrically via its inlet by electricity that may be AC or direct current (DC). This electricity fed to the inlet may come from the electricity network on board an aircraft.

The non-rotary converter converts the electricity that is fed thereto into AC at a frequency higher than one kilohertz.

This AC is delivered to a transformer. Surprisingly, it is found that the transformer can be arranged inside a pole, and thus inside a mast that receives the pole within it. The pole is suitable in particular for fitting to a lift rotor of a rotary wing aircraft, even though it has a mast with a diameter that is relatively small.

By using AC at high frequency it is possible to implement a transformer that is capable of being inserted in the pole.

The primary member of the transformer is stationary, being secured to the non-rotary casing, and being connected to the non-rotary converter in order to receive the AC. In contrast, the secondary member is secured to the rotary casing.

The AC coming from the non-rotary converter then becomes transformed AC after passing through the transformer. It should be observed that the transformed AC may have the same characteristics as the AC fed to the transformer.

In addition, the transformer enables electricity to be transferred from a stationary reference frame, i.e. the non-rotary converter, to a rotary reference frame associated with a rotor.

The electricity leaving the transformer can then be transmitted directly or indirectly to electrical equipment of the rotor.

Under such circumstances, the pole of the invention allows electricity to be transferred from a stationary reference frame to a rotary reference frame via a removable device. The removable nature of the device makes application of the device particularly advantageous, specifically in the narrow technical field of rotorcraft. Furthermore, maintenance actions on the device are relatively easy insofar as the device can be removed from the rotor for this purpose.

In addition, the device does not have any brushes, but makes use of a rotary transformer. The device thus tends to minimize any risk of wear due to friction.

In another aspect, the transformer does not represent an electricity generator. Thus, the rotary casing and the non-rotary casing need not necessarily present a large difference of speed of rotation. This characteristic tends to optimize the manufacture and the arrangement of the pole.

In addition, the pole does not require any mechanical energy to be transferred between its non-rotary portion and its rotary portion. Its parts can therefore be dimensioned in order to minimize the weight of the device.

Furthermore, detecting failures of an electrical power supply device can sometimes be difficult. The pole has a non-rotary converter and a transformer that are structurally distinct. Under such circumstances, the converter may present integrated test means to facilitate locating a failure, if any.

The synergy of the means involved thus makes it possible to obtain a removable device that is relatively reliable and optimized from a maintenance point of view.

The device may also include one or more of the following additional characteristics.

The link means may comprise both coupling means allowing misalignment between the pole and the reference member, and also a self-locking coupling such as a jaw clutch for fastening to a reference member.

The jaw clutch then enables fastening with the reference member to be performed easily, quickly, and blind. The jaw clutch then serves to provide mechanical indexing for the pole and in particular for the non-rotary casing relative to a stationary portion of an aircraft.

The coupling means make it possible to accommodate misalignment between the non-rotary casing and the reference member. A particular function of the coupling means is then to compensate for deformation of the mast in flight, if any.

Any known coupling means can be envisaged. By way of example, the coupling means may comprise means having diaphragms.

In addition, since the pole has a projecting fastener collar for temporarily securing the upper tube to the mast, the device optionally includes a wheel of a flexible material selected from the elastomer group that is fastened to the collar, the wheel being provided with peripheral teeth suitable for co-operating by interfering shapes with a rotary member of a rotor.

A particular function of the wheel is to avoid the mast being jammed in the event of the transformer jamming.

In addition, the rotary casing and the non-rotary casing may co-operate via rolling bearing means. For example, one of the casings may penetrate at least in part in the other casing, with at least two rolling bearing means being interposed between the two casings.

In an embodiment, the non-rotary casing is a lower hollow tube that penetrates in part into the rotary casing, the rotary casing being an upper hollow tube.

Furthermore, the non-rotary converter is advantageously arranged inside the non-rotary casing.

In a first embodiment, the secondary member is connected by a wire or wireless electrical connection to at least one piece of equipment of the rotor.

In contrast, in a second embodiment, the pole is provided with a rotary converter fastened to the rotary casing, the rotary converter being connected to the transformer and being provided with at least one outlet for electrically powering equipment of a rotor.

The rotary converter makes it possible to control the amount of electricity that is delivered via the pole to equipment of the rotor.

The rotary converter may serve in particular to output electricity in AC or DC form.

Furthermore, the rotary converter may also be a voltage, current, and/or power regulator.

The rotary converter may also include elements for controlling electrical equipment of the rotor. For example, the rotary converter may include a sequencer for causing different pieces of equipment to operate in a sequence defined by the manufacturer.

The rotary converter may optionally be arranged inside the rotary casing, being constrained to rotate with the rotary casing.

In a first variant, the primary member and the secondary member are coaxial, the secondary member surrounding the primary member at least in part, an annular airgap separating the secondary member from the primary member. The primary member is then in a central position, the secondary member being at the periphery of the primary member.

The airgap of the transformer makes it possible in particular to compensate for residual slack, if any.

In a second variant, the primary member and said secondary member are coaxial, the primary member surrounding the secondary member at least in part, an annular airgap separating said secondary member from said primary member. Under such circumstances, the secondary member is then in a central position, the primary member being at the periphery of the secondary member.

In a third variant, the primary member and the secondary member are arranged in succession one after another along an axis of rotation of the rotary casing, a plane airgap separating the secondary member from the primary member.

Furthermore, the transformer may include a primary member and a secondary member provided in redundant manner.

It is also possible to provide two non-rotary converters and two rotary converters, where appropriate.

Furthermore, the transformer may be a single-phase transformer in order to minimize its overall size and make it easier to arrange it within a mast.

In addition, the transformer may be a high frequency transformer operating over a frequency range from 1 kilohertz (kHz) to 500 kHz. The higher the frequency the greater the extent to which certain members, and in particular the transformer, can be made to be compact.

Furthermore, the pole may include signal transmission means for transmitting electrical signals by amplitude modulation of voltage or current in order to enable signals to be transmitted in both directions.

The pole may include signal transmission means for transmitting electrical signals by signal modulation (amplitude, frequency, high frequency (HF) superposition, or other) via the transformer or using any other transmission technology (e.g. inductive, capacitive, or optical) in order to enable signals to be transmitted in both directions.

The signal transmission means may include a non-rotary modulator and a non-rotary demodulator arranged upstream from the transformer and co-operating with a non-rotary interface, together with a rotary modulator and a rotary demodulator arranged downstream from the transformer and co-operating with a rotary interface.

The invention also provides an aircraft having an airframe and a non-rotary reference member, the airframe carrying a rotor that is driven in rotation by a mast and said rotor including at least one piece of electrical equipment.

The aircraft then also includes an electrical power supply device as described above for powering said equipment.

BRIEF DESCRIPTION OF THE SEVERAL VIEWS OF THE DRAWINGS

The invention and its advantages appear in the context of the following description of embodiments given by way of illustration and with reference to the accompanying figures, in which.

DETAILED DESCRIPTION OF THE INVENTION

Elements that are present in more than one of the figures are given the same references in each of them.

Figure 1:
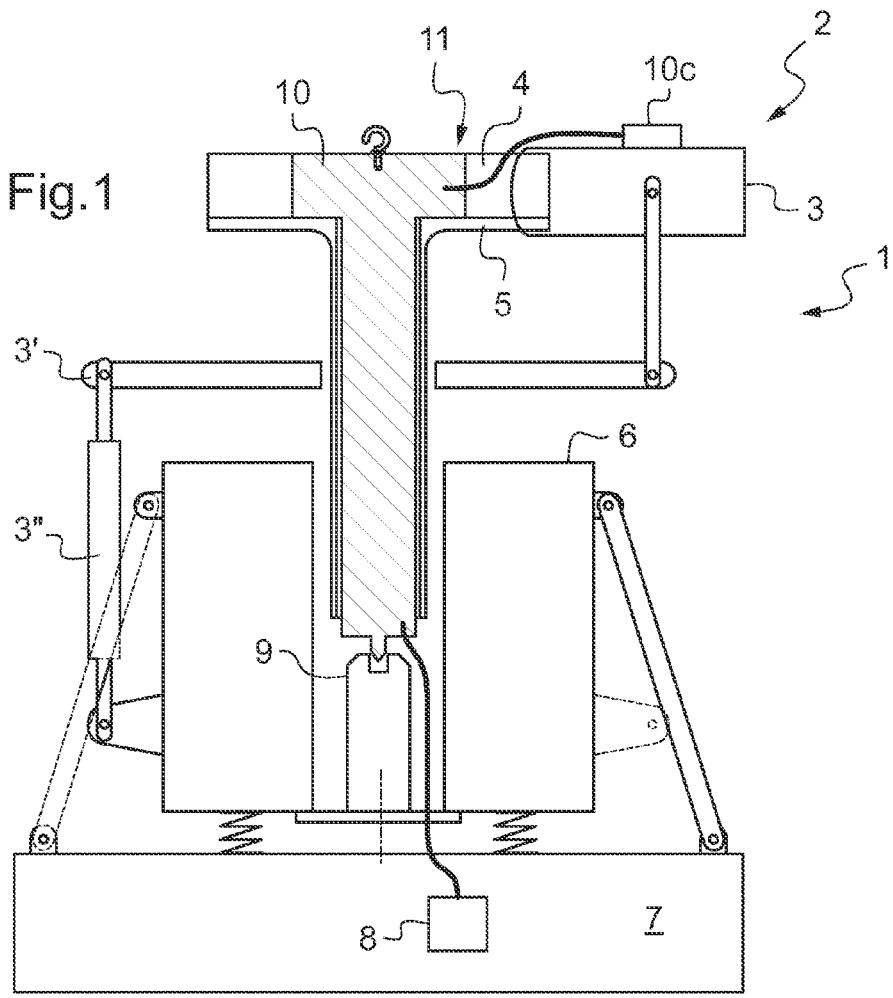
FIG. 1 is a view of an aircraft fitted with an electrical power supply device.

FIG. 1 shows an aircraft 1 having an airframe 7 carrying a main gearbox 6 driving a rotor 2 via a mast 5. The rotor 2 is a rotor for providing a helicopter or the equivalent with lift or indeed propulsion.

The mast 5 is constrained to rotate with a hub 4 of the rotor that has a plurality of blades 3, it being possible to vary the pitch of the blades 3 by servo-controls 3" with the help of a set of two control plates 3' also known as "swashplates" and shown in diagrammatic manner.

Furthermore, the rotor may include electrical equipment 100, such as a de-icing member, for example. Under such circumstances, the aircraft 1 includes a removable electrical power supply device 10.

This electrical power supply device 10 comprises a pole 11 suitable for being inserted at least in part inside the mast 5. The electrical power supply device 10 then transmits electricity to the equipment of the rotor, which electricity is taken from an electricity network 8 of the aircraft.

Figure 2:
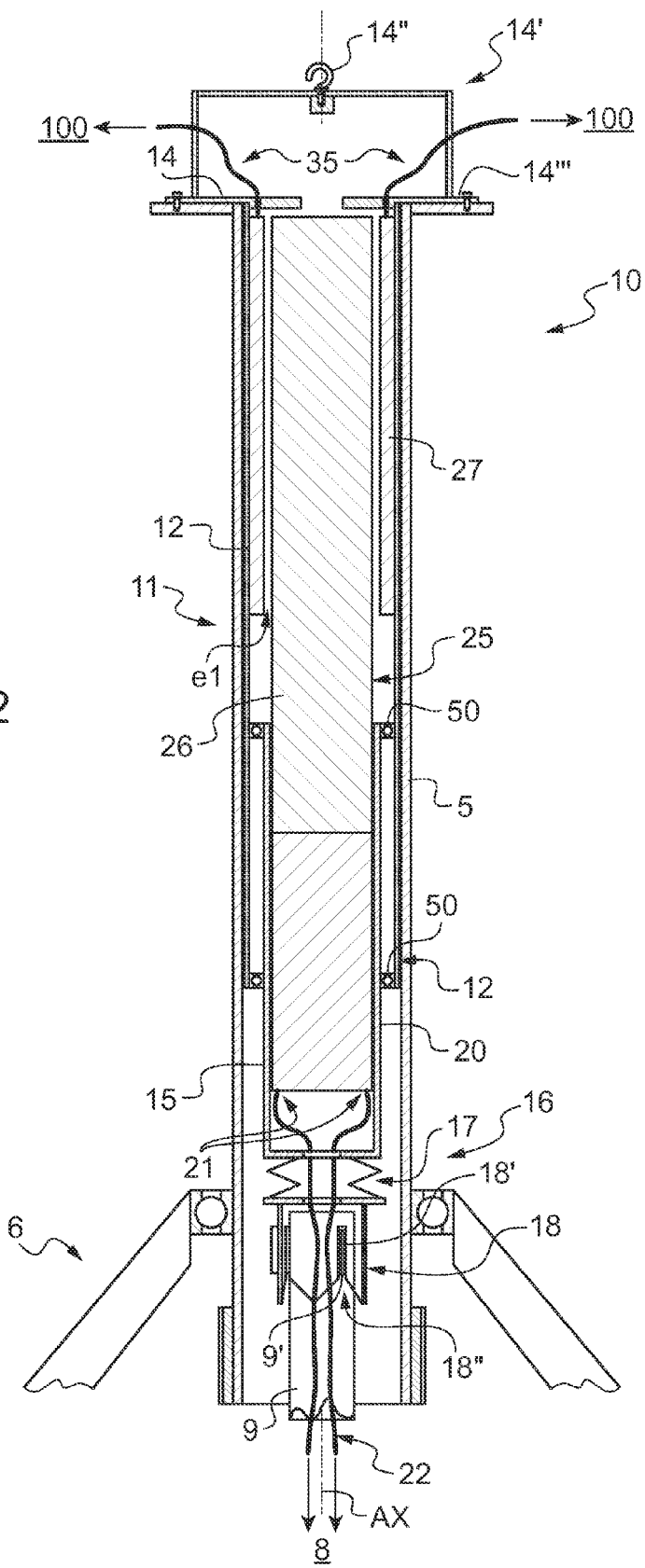
FIG. 2 is a view of a first embodiment of the electrical power supply device.

FIG. 2 shows an electrical power supply device 10 in a first embodiment.

Independently of the embodiment, the pole 11 comprises a rotary casing 12 suitable for being fastened to the mast 5 via fastener means 14.

The fastener means may comprise a projecting collar 14''' screwed to a shoulder of the mast 5, for example. In addition, the collar 14''' may include lifting means 14' fitted with a lifting hook 14''.

Figure 3:
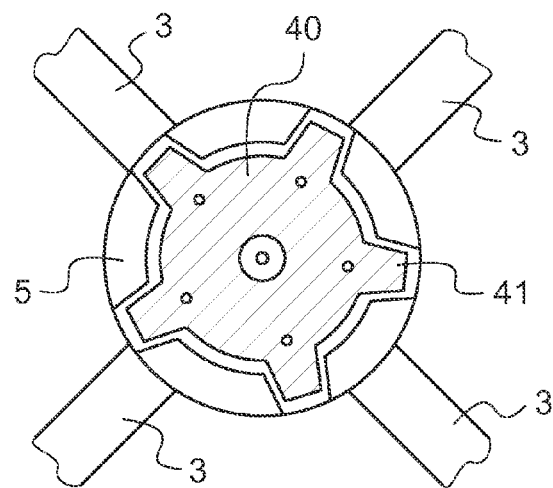
FIG. 3 is a diagram showing a flexible wheel arranged between a rotary casing and a mast of a rotor.

With reference to FIG. 3, the device 10 may include upper fuse means comprising a wheel 40 interposed between the collar 14''' of the pole 11 and the mast 5. This wheel has specifically the function of minimizing the risk of the rotor jamming in the event of at least one member of the pole 11 jamming. This wheel 40 is thus fastened to the collar and co-operates by interfering shapes with a rotary member of the rotor.

For example, the wheel 40 has a plurality of teeth 41 received in hollow spaces in the mast 5. In addition, the wheel 40 is made from a flexible material selected from the group comprising elastomers.

In normal operation, the mast 5 drives the rotary casing 12 in rotation via the wheel 40. However, if a rotary member of the pole 11 jams, the flexibility of the wheel allows the teeth 41 to deform so as to avoid jamming the rotation of the rotor.

The wheel 40 thus constitutes mechanical declutching means for use in the event of the electrical power supply device 10 jamming. Furthermore, it can be understood that the wheel 40 serves to absorb manufacturing clearances, or indeed to compensate for possible deformation of the mast during certain stages of flight.

With reference to FIG. 2, and in alternative manner, the means for fastening the collar 14 to the mast 5 may include a fuse-forming section, the fastener means possibly including pins or the equivalent, for example.

In addition to a rotary casing, the pole 11 includes a non-rotary casing 15.

The rotary casing 12 and the non-rotary casing 15 are constituted, for example, by hollow tubes extending along the axis of rotation AX of the rotor.

One of the casings may also penetrate at least in part into the other casing. The pole 11 may then be provided with guide, centering, and fastening means having at least one rolling bearing means 50 interposed between the rotary casing 12 and the non-rotary casing 15.

In the example shown, the non-rotary casing penetrates in part into the rotary casing, with two ball or roller bearing means 50 being interposed between the rotary casing 12 and the non-rotary casing 15.

The rotary casing and the non-rotary casing are thus constrained to move together in translation along the axis of rotation AX, but they are free to move relative to each other in rotation about the axis of rotation AX. Ignoring functional clearances, the device presents a single degree of freedom to move in rotation about the axis of rotation AX between its non-rotary bottom portion having the non-rotary casing and its rotary top portion having the rotary casing.

Furthermore, the pole 11 includes self-locking link means 16 for connecting the non-rotary casing to a non-rotary reference member 9 of the aircraft.

The rotary casing 12 is thus set into rotation about the axis of rotation AX by the mast 5 via the fastener means 14, whereas on the contrary the non-rotary casing is prevented from moving in rotation about the axis of rotation AX by the reference member 9 acting via the link means 16.

The link means 16 comprise a self-locking coupling of the jaw clutch type 18 suitable for engaging the stationary reference member 9, such as a fastener pin secured to the bottom of the gearbox 6, for example. The jaw clutch 18 may have slots 18' opening out to sloping faces 18" co-operating with projections 9' of the stationary reference member 9.

The link means 16 may also comprise coupling means 17 arranged between the jaw clutch 18 and the non-rotary casing 15 in order to accommodate misalignment between the non-rotary casing 15 and the jaw clutch 18.

The link means may also include a fuse zone, representing mechanical declutching means that operate in the event of a rotary member of the device jamming.

In order to install the device 10 on a rotor, an operator slides the pole 11 inside the mast 5, and then screws the collar 14''' to the shoulder of the mast 5. The operator may use the lifting hook for handling the pole 11.

This operation is reversible, it being possible for the device 10 to be removed when the rotor does not have any electrical equipment 100 for powering electrically, or else when performing maintenance operations, for example.

In order to power such equipment 100 electrically, the pole 11 has a non-rotary converter 20.

The non-rotary converter 20 is then fastened by conventional means to the non-rotary casing 15. More precisely, the non-rotary converter 20 may be arranged inside the non-rotary casing 15, being fastened against an inside wall of the non-rotary casing 15.

The non-rotary converter is then provided with at least one inlet 21 for receiving electricity coming from the electricity network 8 of the aircraft. Thus, the non-rotary converter can communicate with the electricity network 8 via a wired or wireless connection 22.

The non-rotary converter is matched to the electricity network. For example, the non-rotary converter may be matched to an electricity network that delivers DC at 270 volts (V) or indeed that delivers AC at 200 V and at a frequency of 400 hertz (Hz).

The non-rotary converter is then an electrical converter that generates AC at a high frequency, higher than one kilohertz, from the electricity it receives. For example, it may deliver single-phase AC.

Furthermore, the pole 11 includes a transformer 25 connected to the non-rotary converter by conventional connections (not shown) in order to transfer electricity from a stationary reference frame to a rotary reference frame. For example, the transformer 25 is a single-phase transformer and/or a transformer suitable for operating over a frequency range extending from 1 kHz to 500 kHz.

The transformer 25 is a rotary transformer incorporated in the pole and comprising a magnetic circuit and windings.

In particular, the transformer 25 possesses a stationary primary member 26 and a rotary secondary member 27 that rotates about the axis of rotation AX. An airgap separates the primary and secondary members 26 and 27 so as to allow this degree of freedom in rotation, while possibly also compensating for residual slack, if any.

Under such circumstances, the primary member 26 is connected to the non-rotary converter 20.

In addition, the primary member 26 is secured by conventional means to the non-rotary casing 15. For example, the primary member is fastened to an inside wall of the non-rotary casing 15.

In contrast, the secondary member 27 is secured by conventional means to the rotary casing 12. For example, the secondary member 27 is fastened to an inside wall of the rotary casing 12.

The transformer is then powered electrically by the non-rotary converter, and it delivers AC via its secondary member.

In the first embodiment of FIG. 2, the secondary member 27 can then deliver power directly to the electrical equipment 100 of the rotor via wired or wireless connections 35.

Figure 4:
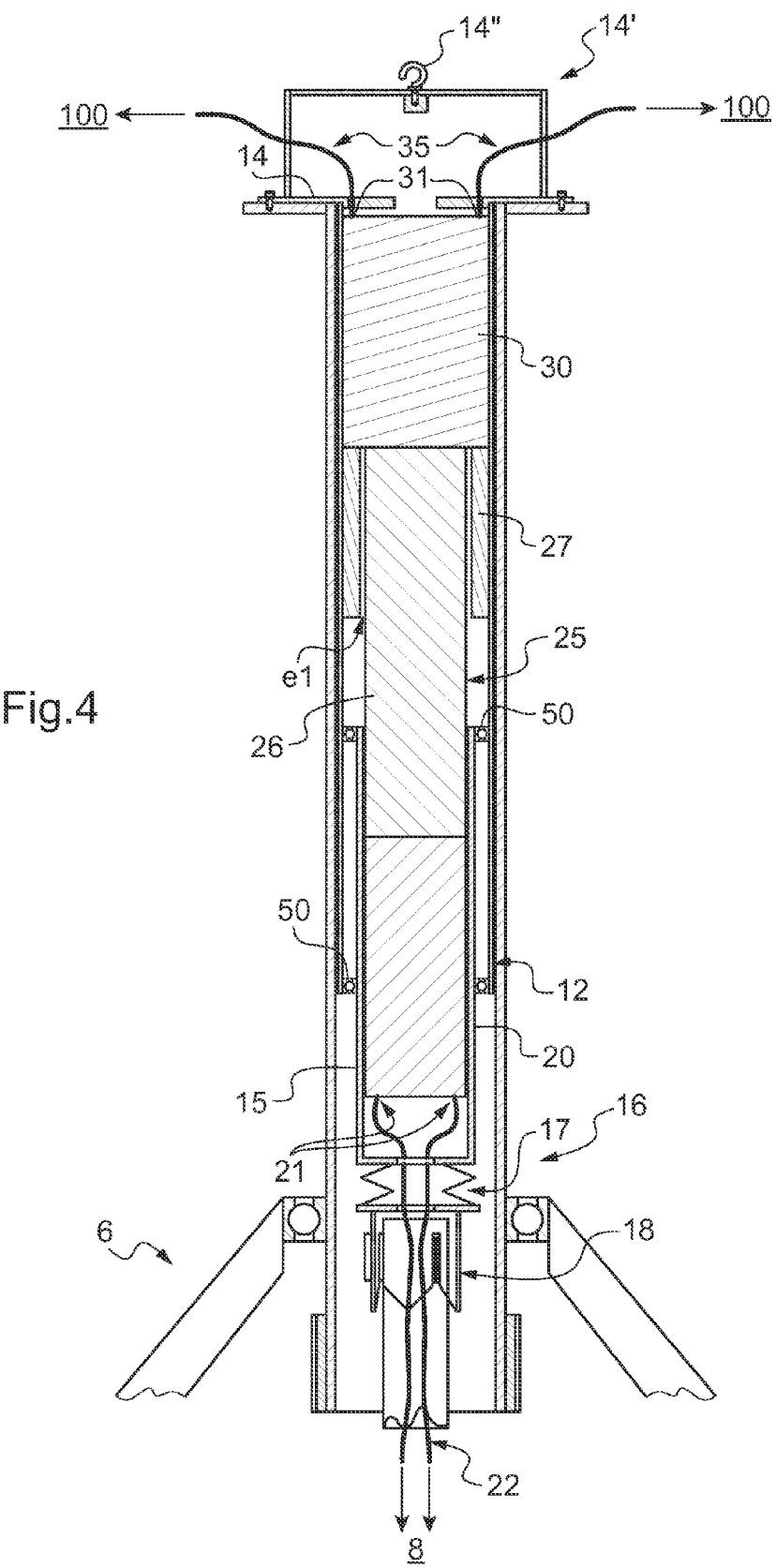
FIG. 4 shows a second embodiment of the power supply device fitted with a top converter.

In the second embodiment of FIG. 4, the pole 11 nevertheless possesses a rotary converter 30 that is powered electrically by the secondary member 27 of the transformer.

The rotary converter 30 is then secured to the rotary casing 12. For example, the rotary converter is arranged inside the rotary casing 12, possibly being fastened to an inside wall of the rotary casing.

The rotary converter is then provided with an outlet 31 suitable for being connected to electrical equipment 100 of the rotor.

Such a rotary converter 30 may be used in particular for converting the AC from the transformer 25 into DC.

Furthermore, in a first variant shown in FIGS. 2 and 4, the primary and secondary members are coaxial, one being engaged inside the other.

In this variant, the secondary member 27 surrounds the primary member 26 at least in part, with an annular airgap e1 lying between the secondary member 27 and the primary member 26.

Figure 5:
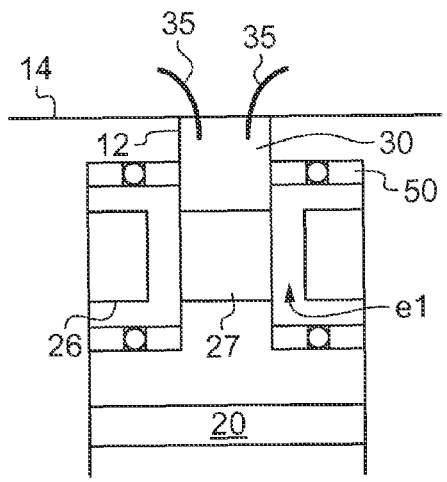
FIGS. 5 to 7 are views for explaining variants of the transformer.

In the second variant of FIG. 5, the primary member and the secondary member are coaxial, likewise with one engaged within the other. Nevertheless, it is the primary member 26 that surrounds the secondary member 27, at least in part, and an annular airgap e1 likewise separates the primary and secondary members 26 and 27.

In this variant, the rotary casing may penetrate into the non-rotary casing.

Figure 6:
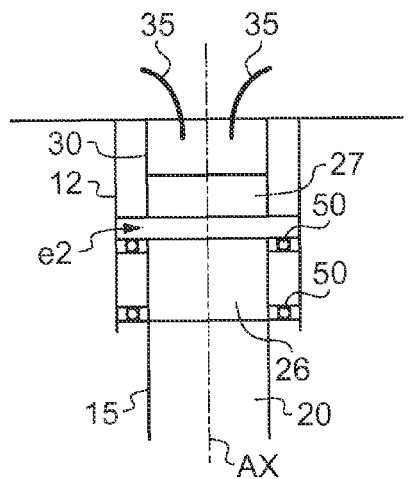

In the third variant of FIG. 6, the primary member 26 and the secondary member 27 face each other. Thus, the primary member 26 and the secondary member 27 are arranged one after another along the axis of rotation AX of the rotary casing 12, there being a plane airgap e2 between the secondary member 27 and the primary member 26. The secondary member 27 is thus above the primary member 26.

Figure 7:
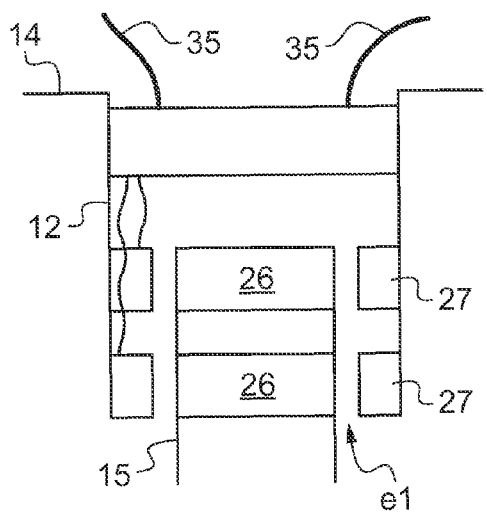

In the variant of FIG. 7, the transformer 25 has a primary member 26 and a secondary member 27 that are provided in redundant manner. The non-rotary converter and possibly also the rotary converter may also be provided in redundant manner.

Figure 8:
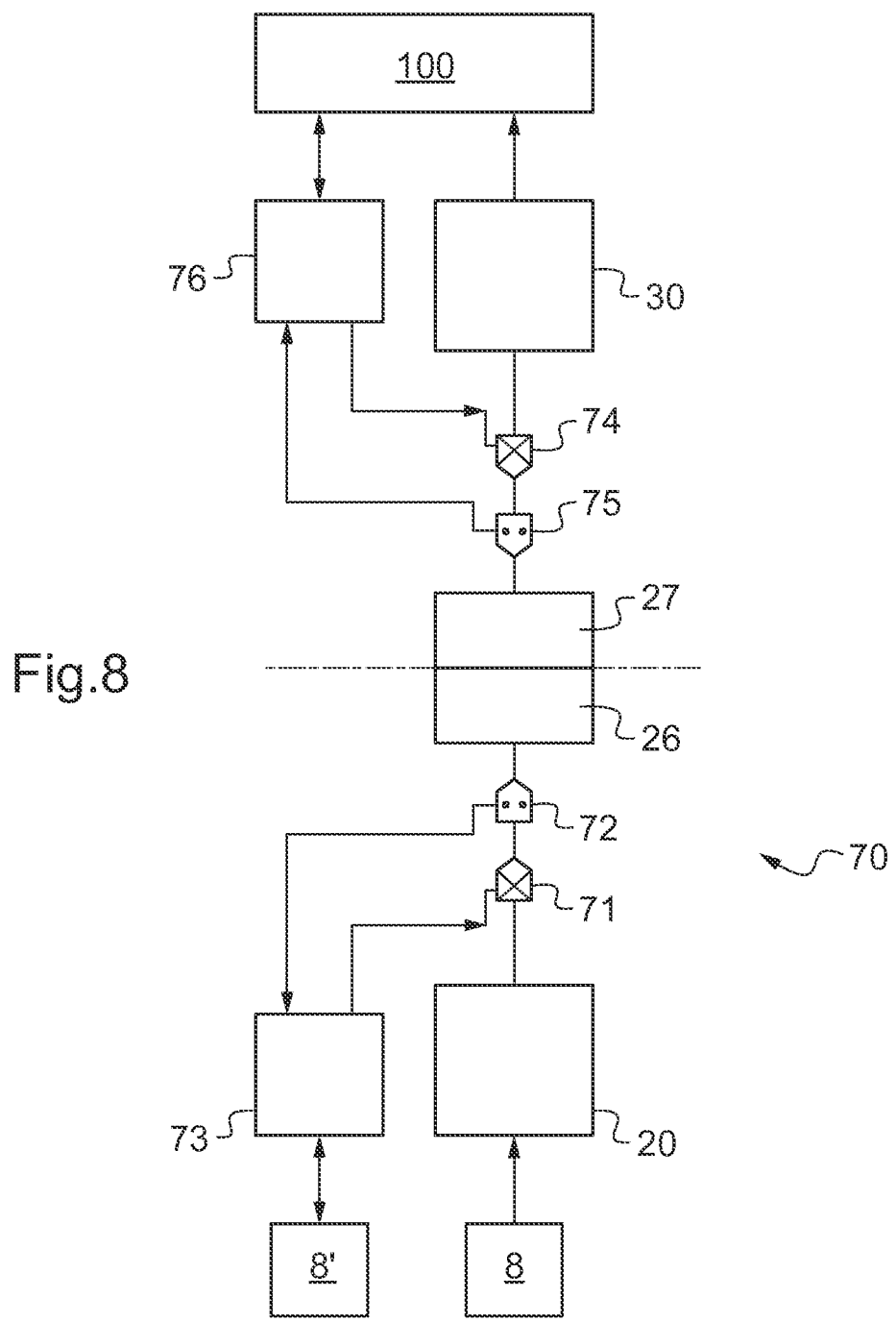
FIG. 8 is a block diagram explaining an embodiment having signal transmission means for transmitting electrical signals by signal modulation.

In addition, in the embodiment of FIG. 8 the pole 11 is also provided with signal transmission means 70 for transmitting electrical signals by signal modulation.

The signal transmission means 70 may include a non-rotary modulator 71 and a non-rotary demodulator 72 arranged upstream from the transformer. The non-rotary modulator 71 and the non-rotary demodulator 72 may be fastened to the non-rotary casing 15 so as to be interfaced between the non-rotary converter 20 and the transformer 25.

Furthermore, the non-rotary modulator 71 and the non-rotary demodulator 72 are connected to a non-rotary interface 73 in association with a member 8' of the aircraft, possibly being means for controlling or exchanging signals with the equipment 100.

The electrical signal transmission means 70 may also include a rotary modulator 74 and a rotary demodulator 75 arranged downstream from the transformer.

The rotary modulator 74 and the rotary non-demodulator 75 may be fastened to the rotary casing 12, e.g. so as to be interfaced between the rotary converter 30 and the transformer 25.

In addition, the rotary modulator 74 and the rotary demodulator 75 are connected to a rotary interface 76 that is connected to equipment 100 of the rotor of the aircraft. This rotary interface 76 may also serve as means for controlling the equipment 100.

In a variant (not shown), signal transmission may be performed by means known from elsewhere.

Naturally, the present invention may be subjected to numerous variations as to its implementation. Although several embodiments are described above, it will readily be understood that it is not conceivable to identify exhaustively all possible embodiments. Naturally it is possible to envisage replacing any of the means described by equivalent means without going beyond the ambit of the present invention.

What is claimed is:

1. An electrical power supply device for powering at least one piece of equipment of an aircraft rotor driven by a mast, said device comprising a removable pole suitable for being reversibly secured to said mast, said pole having a rotary casing provided with fastener means for fastening to said mast, and a non-rotary casing secured to link means suitable for being fastened to a reference member of said aircraft, wherein said pole comprises:
   a non-rotary converter fastened to the non-rotary casing and provided with an inlet suitable for being fed with electricity coming from an electricity network of said aircraft, said non-rotary converter being an electrical converter that generates AC at a frequency higher than one kilohertz from said electricity fed to the inlet; and
   a rotary transformer incorporated in the pole, said transformer having a primary member secured to the non-rotary casing and a secondary member secured to the rotary casing, the primary member being connected to the non-rotary converter to receive said AC, and the secondary member being suitable for electrically powering equipment of a rotor.

2. A device according to claim 1, wherein said link means comprise firstly coupling means allowing for misalignment between the pole and the reference member, and secondly a jaw clutch for fastening the pole to said reference member.

3. A device according to claim 1, wherein said non-rotary converter is arranged inside said non-rotary casing.

4. A device according to claim 1, wherein said pole is provided with a rotary converter fastened to said rotary casing, the rotary converter being connected to said transformer and being provided with at least one outlet for electrically powering equipment of a rotor.

5. A device according to claim 4, wherein said rotary converter is arranged inside said rotary casing.

6. A device according to claim 1, wherein said primary member and said secondary member are coaxial, said secondary member surrounding said primary member at least in part, an annular airgap (e1) separating said secondary member from said primary member.

7. A device according to claim 1, wherein said primary member and said secondary member are coaxial, said primary member surrounding said secondary member at least in part, an annular airgap (e1) separating said secondary member from said primary member.

8. A device according to claim 1, wherein said primary member and said secondary member are arranged in succession one after another along an axis of rotation (AX) of the rotary casing, a plane airgap (e2) separating said secondary member from said primary member.

9. A device according to claim 1, wherein said transformer includes a primary member and a secondary member provided in redundant manner.

10. A device according to claim 1, wherein said transformer is a single-phase transformer.

11. A device according to claim 1, wherein said transformer is a high frequency transformer operating over a frequency range extending from 1 kHz to 500 kHz.

12. A device according to claim 1, wherein said pole includes transmission means for transmitting electrical signals by signal modulation.

13. A device according to claim 12, wherein said signal transmission means includes a non-rotary modulator and a non-rotary demodulator arranged upstream from the transformer and co-operating with a non-rotary interface, together with a rotary modulator and a rotary demodulator arranged downstream from the transformer and co-operating with a rotary interface.

14. An aircraft having an airframe and a non-rotary reference member, the airframe carrying a rotary rotor driven by a mast, said rotor having at least one piece of electrical equipment, wherein the aircraft includes an electrical power supply device according to claim 1 for electrically powering said equipment.

* * * * *